United States Patent
Day et al.

(10) Patent No.: US 12,240,611 B2
(45) Date of Patent: Mar. 4, 2025

(54) AIRCRAFT SEAT WITH INTERNAL SEAT PAN RETURN SPRING MECHANISM

(71) Applicant: AMI Industries, Inc., Colorado Springs, CO (US)

(72) Inventors: Martin S. Day, Colorado Springs, CO (US); Chad Pacheco, Colorado Springs, CO (US); Douglas Foisie, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 244 days.

(21) Appl. No.: 17/966,283

(22) Filed: Oct. 14, 2022

(65) Prior Publication Data
US 2024/0124142 A1 Apr. 18, 2024

(51) Int. Cl.
| | |
|---|---|
| *B64D 11/06* | (2006.01) |
| *A47C 1/12* | (2006.01) |
| *A47C 9/06* | (2006.01) |
| *B60N 2/30* | (2006.01) |

(52) U.S. Cl.
CPC .......... *B64D 11/064* (2014.12); *B64D 11/062* (2014.12); *A47C 1/12* (2013.01); *A47C 9/06* (2013.01); *B60N 2/3027* (2013.01); *B64D 11/0691* (2014.12)

(58) Field of Classification Search
CPC .............. B64D 11/064; B64D 11/0691; B64D 11/0698; B60N 2/3027; B60N 2/307; B60N 2/3093; B60N 2/3047; B60N 2/24; A47C 1/12; A47C 1/121; A47C 1/16; A47C 9/06
See application file for complete search history.

(56) References Cited

U.S. PATENT DOCUMENTS

| | | | |
|---|---|---|---|
| 6,152,401 A * | 11/2000 | Green | ...................... B60N 2/24 244/118.6 |
| 6,267,426 B1 * | 7/2001 | Seibold | ................ B60N 2/3047 296/65.09 |
| 9,848,708 B2 | 12/2017 | Windsor | |
| 10,293,944 B2 * | 5/2019 | Spagl | ................. B64D 11/0698 |
| 11,178,972 B2 | 11/2021 | Ballendat et al. | |

FOREIGN PATENT DOCUMENTS

| | | |
|---|---|---|
| CN | 110916412 A | 3/2020 |
| FR | 2233798 | 1/1975 |
| GB | 214099 A | 4/1924 |
| GB | 2477497 B | 4/2014 |

* cited by examiner

*Primary Examiner* — Syed A Islam
(74) *Attorney, Agent, or Firm* — Suiter Swantz IP

(57) ABSTRACT

An aircraft seat assembly including first and second stanchions forming interior spaces open through forward slots. A seat pan is pivotally attached to the stanchions and includes rearward extensions that extend through the forward slots and are received in the interior spaces. First and second spring mechanisms reside in the respective first and second interior spaces and are attached at opposing ends to their respective stanchion and to the seat pan. In use, rotating the seat pan toward a deployed position elongates the first and second elongation springs thereby energizing a return force of the spring mechanisms.

15 Claims, 13 Drawing Sheets

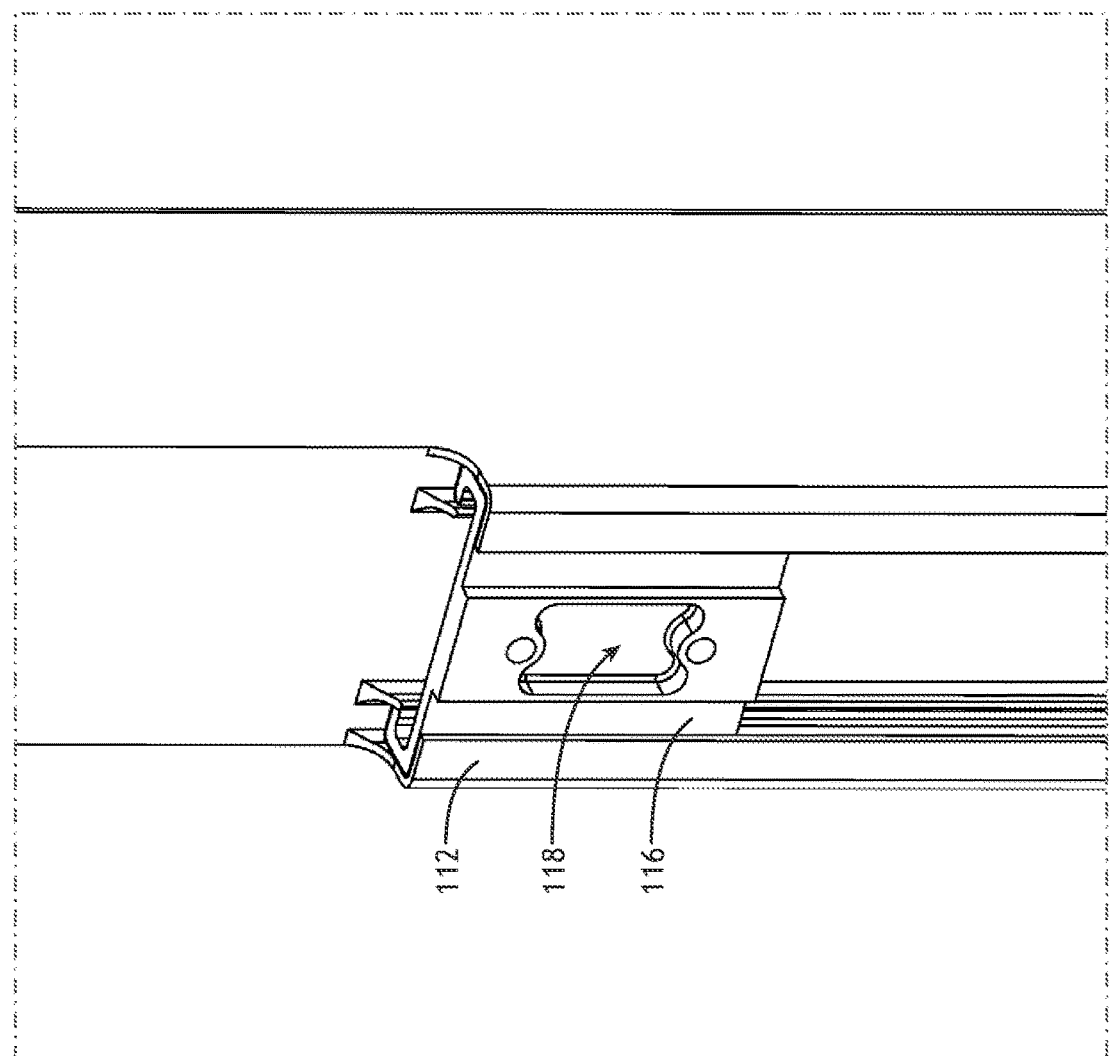

AIRCRAFT SEAT WITH INTERNAL SEAT PAN RETURN SPRING MECHANISM

TECHNICAL FIELD AND BACKGROUND

The present disclosure relates generally to aircraft seats including stowable support surfaces, and more particularly to an internally housed return spring mechanism for an aircraft seat equipped with a stowable seat pan.

Certain types of aircraft seats are equipped with a seat pan configured to stow between uses of the seat. Examples include, but are not limited to, jump seats, passenger seats, and cabin attendant seats in both civilian and military aircraft. Such seats typically include a seat frame supporting a seat pan and a seat back. The seat pan may be rotationally coupled to the seat back and/or to the seat frame such that the seat pan is configured to pivot between stowed and deployed positions. When stowed, the seat pan is typically substantially vertical and positioned against the front of the seat back. When deployed, the seat pan is typically substantially horizontal or inclined slightly to provide a comfortable ergonomic sitting position.

In such seats, the seat pan typically stows automatically between uses of the seat to leave open egress pathways in the aircraft. Conventional automatic return mechanisms typically employ a spring that coincides with the seat pan rotational axis. In use, the return mechanism is energized when the seat pan is moved toward the deployed position such that, when the seat is unloaded, the energized return mechanism provides a rotational force that returns the seat pan to the stowed position.

Such conventional return mechanisms typically employ flat and coiled types of torsion springs in their design. While suitable for providing a lifting force, flat springs inherently create an uneven closing torque between the right and left sides of the seat, and coil springs are bulky and consume valuable space within the seat pan that could be better utilized.

Therefore, what is needed is an automatic seat pan closure solution that overcomes the disadvantage of prior art solutions.

BRIEF SUMMARY

In one aspect, the present disclosure provides an aircraft seat assembly including first and second stanchions forming respective first and second interior spaces accessible through respective first and second forward slots. A seat pan is pivotally attached to the first and second stanchions and includes first and second rearward extensions that extend through the respective first and second forward slots and are received in the respective first and second interior spaces. A seat back is attached at one end to the first and second stanchions and at an opposing end to the seat pan. First and second spring mechanisms reside in the respective first and second interior spaces, wherein the first spring mechanism includes a first extension spring attached at one end to the first rearward extension and attached at an opposing end to the first stanchion, and the second spring mechanism includes a second extension spring attached at one end to the second rearward extension and attached at an opposing end to the second stanchion. In use, movement of the seat pan toward a deployed position of the seat pan elongates the first and second elongation springs thereby energizing the springs to provide lift assistance to the seat pan in the absence of a load on the seat pan.

In some embodiments, an opposing end of the seat back is pivotally attached to the seat pan forward of the pivotal attachment of the seat pan to the first and second stanchions.

In some embodiments, the first and second forward slots are elongated vertical slots.

In some embodiments, the attachment of the opposing ends of the first and second elongation springs to the respective first and second stanchions is positioned below the pivotal attachment location of the seat pan to the first and second stanchions.

In some embodiments, the seat pan includes a tubular U-shaped frame member.

In some embodiments, the seat assembly further includes first and second flexible side bolsters coupled between the seat back and the seat pan.

In some embodiments, the seat assembly further includes a multi-point passenger restraint.

In some embodiments, the seat pan is configured to pivot and between a stowed position and the deployed position, and wherein movement of the seat pan toward the stowed position causes a bottom end of the seat back to move in a direction toward the first and second stanchions.

In some embodiments, each of the first and second stanchions are extruded.

In another aspect, the present disclosure provides an aircraft seat assembly including first and second stanchions forming respective first and second interior spaces accessible through respective first and second forward slots, a seat pan rotationally coupled to the first and second stanchions and configured to rotate between a stowed position and a deployed position, the seat pan including first and second rearward extensions that extend through the respective first and second forward slots and are received in the respective first and second interior spaces, and first and second spring mechanisms that reside in the respective first and second interior spaces, wherein the first spring mechanism includes a first extension spring attached at one end to the first rearward extension and attached at an opposing end to the first stanchion, and the second spring mechanism includes a second extension spring attached at one end to the second rearward extension and attached at an opposing end to the second stanchion, wherein rotation of the seat pan toward the deployed position simultaneously elongates the first and second elongation springs.

In some embodiments, the first and second elongation springs are oriented substantially vertical in the respective first and second interior spaces.

This brief summary is provided solely as an introduction to subject matter that is fully described in the detailed description and drawings. This brief summary should not be considered to describe essential features nor be used to determine the scope of the claims. Moreover, it is to be understood that both the foregoing brief summary and the following detailed description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the disclosure are disclosed in the following detailed description and the accompanying drawings. The drawings are not necessarily to scale.

In general, operations of disclosed processes may be performed in an arbitrary order, unless otherwise provided in the claims. In the drawings:

FIG. 2 is a detailed view of a seat bucket attachment of the aircraft seat assembly in accordance with an embodiment of this disclosure;

DETAILED DESCRIPTION OF THE INVENTION

Figure 1A:
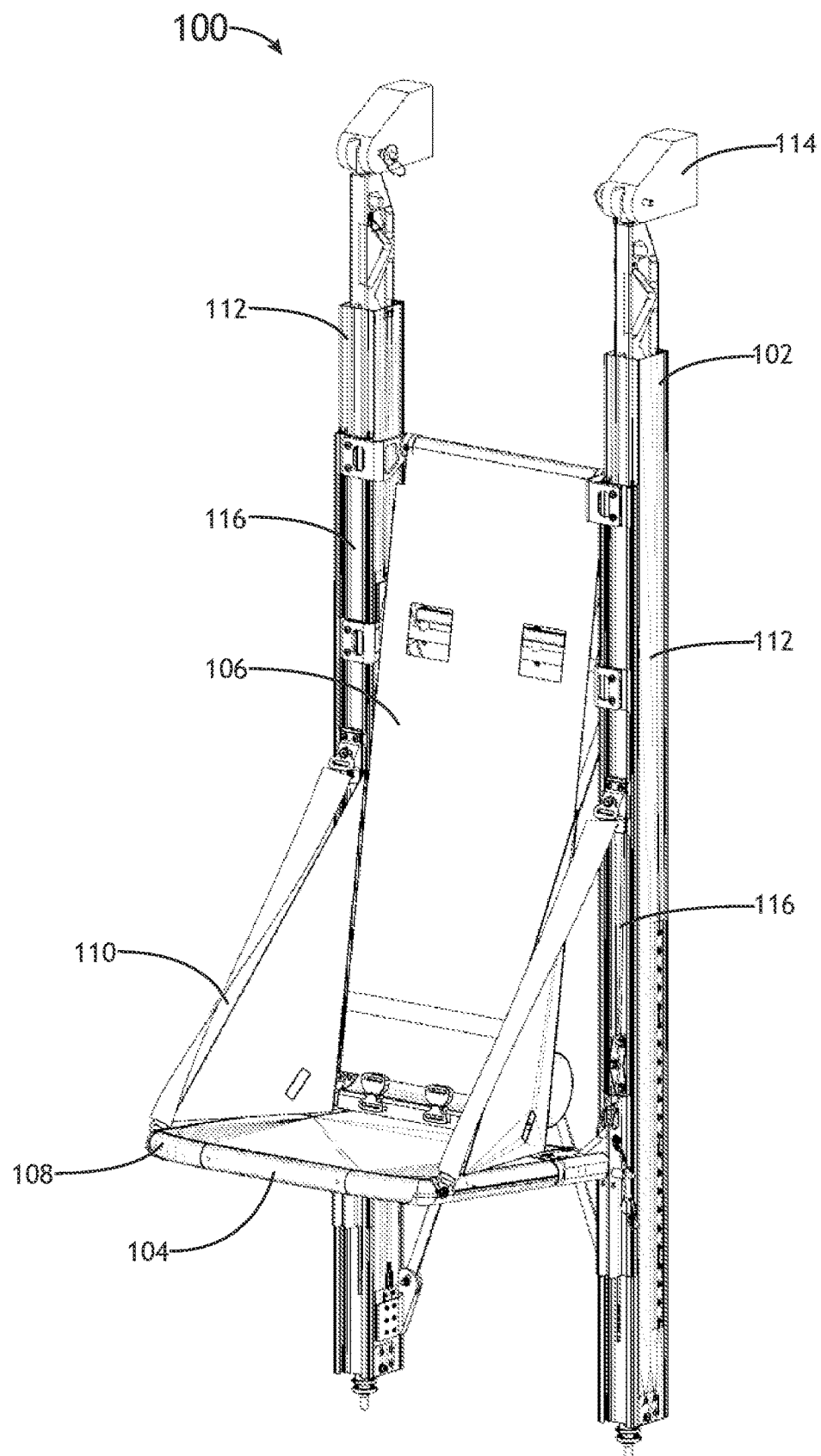
FIG. 1A-1D are various isometric, front and side views of an aircraft seat assembly in accordance with an embodiment of this disclosure.
Figure 1B:
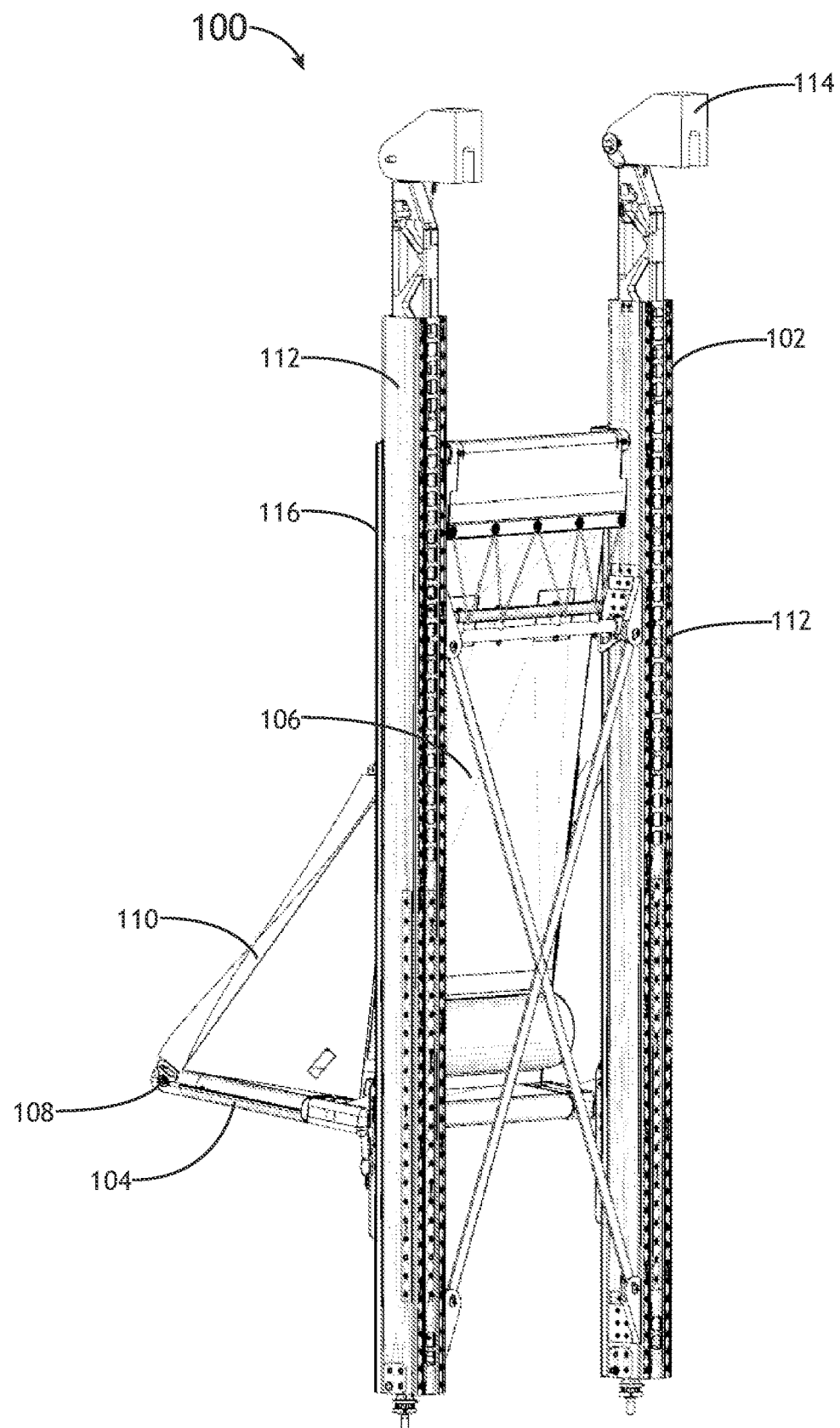
Figure 1C:
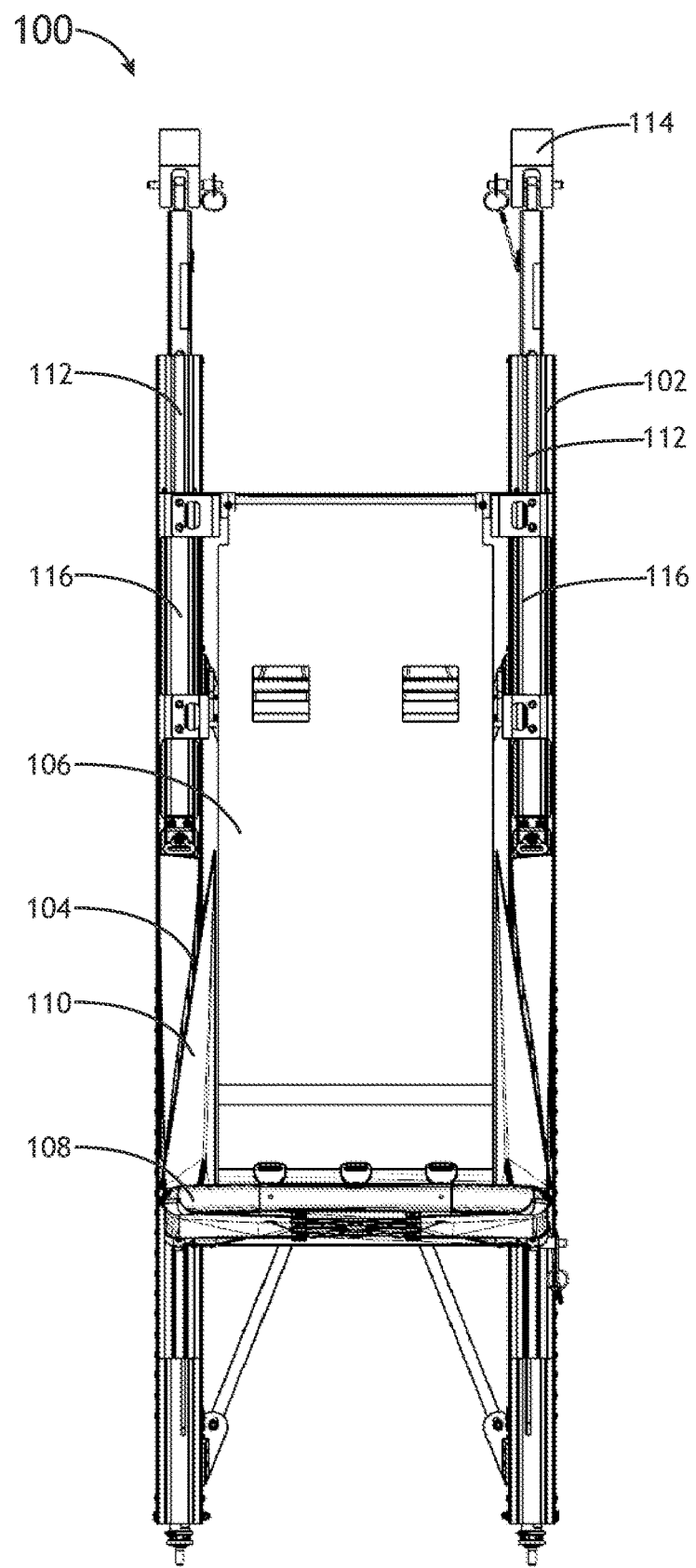
Figure 1D:
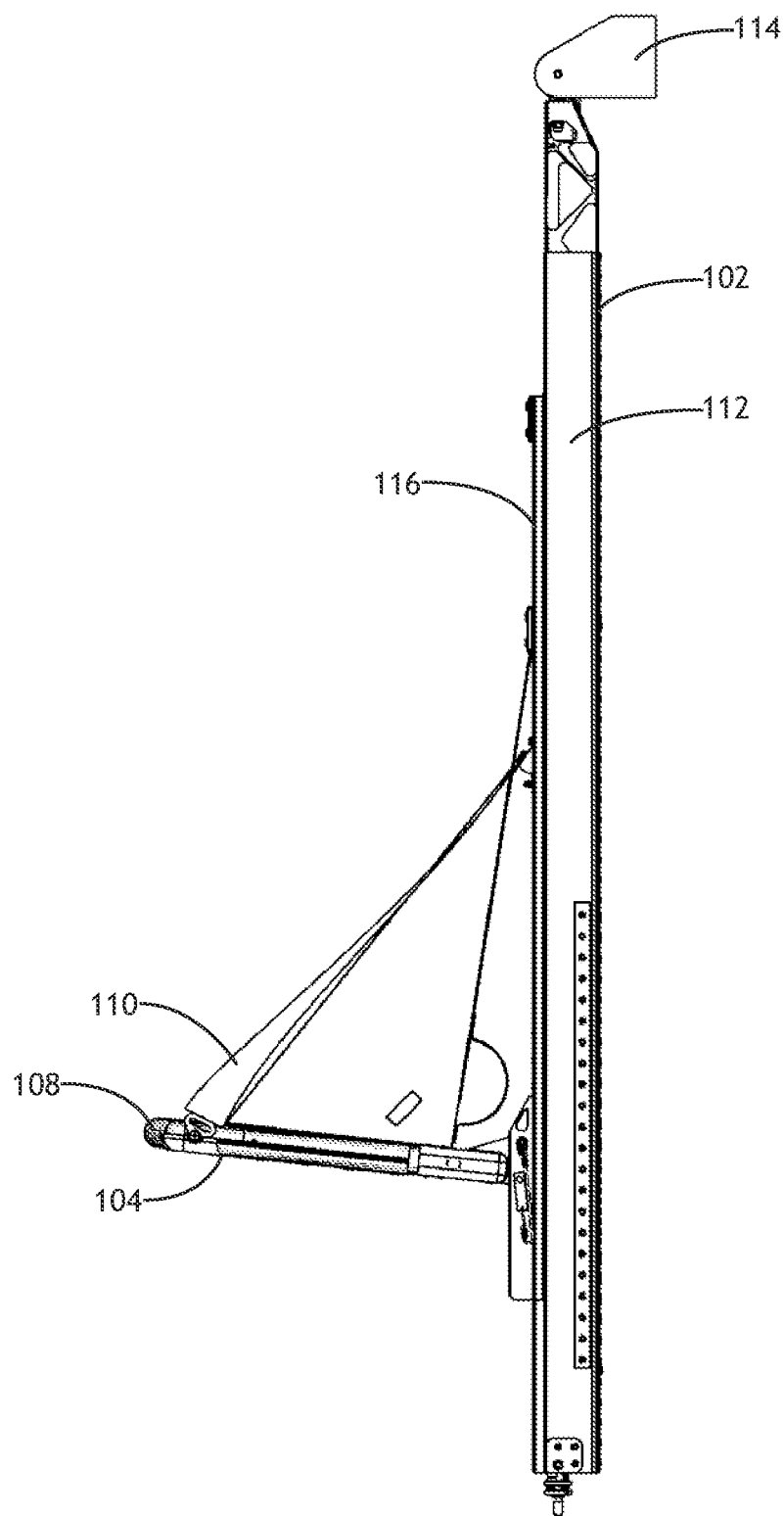

Reference will now be made in detail to the subject matter disclosed, which is illustrated in the accompanying drawings.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Broadly, the present disclosure provides an embodiment of a seat assembly for an aircraft such as a rotorcraft. Aspects of the seat assembly disclosed herein are applicable to various aircraft seat types including, but not limited to, pilot seats, copilot seats, jump seats, crew seats, and passenger seats, as well as seats used on conveyances other than aircraft. The seat assembly generally includes a seat bucket coupled to at least one movable component, and preferably coupled to two movable components in a symmetrical configuration. In embodiments, the seat bucket position is fixed relative to the movable components, and in some cases positionally fixed with the exception of vertical adjustment. The movable components are coupled to stationary components. During normal use (i.e., standard use of the seat in the absence of a dynamic event), relative motion between the movable component and the fixed component is prevented. During a dynamic event (i.e., emergency condition), the movable component moves relative to the stationary component and the energy absorber acts to attenuate energy via plastic deformation to control the seat motion to protect the occupant, for example protect the occupant's spine. In some embodiments, the motion path of the movable component is linear.

FIGS. 1A-1D illustrate an aircraft seat assembly 100 in accordance with an embodiment of the present disclosure. The seat assembly 100 generally includes a seat frame 102 supporting a seat bucket 104. In some embodiments, the seat bucket 104 includes a seat back 106 and a seat pan 108 pivotally attached to the seat back 106. Straps 110 may span between the detached edge of the seat pan 108 and the seat back 106, or the seat frame 102, to stabilize and limit rotational motion of the seat pan 108. In use, the seat pan 108 may fold upward against the seat back 106 for compact stowage of the seat bucket 104. Although not shown, the seat bucket 104 may be equipped with a passenger restraint.

The seat frame 102 generally includes at least one stanchion 112, and preferably a pair of spaced stanchions 112 in a symmetrical arrangement with the seat bucket 104 centered relative thereto. Each stanchion 112 may be elongated and may be coupled to upper and lower frame members including attachments 114 that function to attach the assembly to the aircraft. In some embodiments, each stanchion 112 is an elongated, thin-walled part formed according to an extrusion process. The seat bucket 104 attaches to at least one motion sled 116, and preferably a pair of motion sleds 116 in a symmetrical arrangement. The motion sleds 116 are slidably disposed in guide channels formed in the stanchions 112 as discussed further below. In embodiments, each stanchion 112 may be stationary and the motion sleds 116 are movable relative to the stanchions 112 during a dynamic event.

During a dynamic event in which a load value exceeds a predetermined threshold load value, the motion sleds 116 are configured to stoke relative to the stanchions 112 along a predetermined motion path. In embodiments, a threshold load value/range may be a lumbar spine load on the occupant as monitored during a dynamic test using an instrumented and anthropomorphically representative test dummy. As such, the load value may change depending on the size percentile of the occupant and also can vary between FAA/EASA certified aircraft requirements and non-FAA/EASA qualified aircraft requirements (e.g., military).

In some embodiments, the predetermined motion path is linear and vertical or substantially vertical. In other embodiments, the motion path may include a combination of linear and rotational motions. The term "dynamic event" as used herein refers to an event, such as a deceleration or acceleration, of sufficient threshold magnitude to activate the energy absorber system of the seat assembly 100 (e.g., a 12G event, a 16G event, etc.). During normal use of the seat assembly 100 (i.e., below the predetermined threshold value), the positions of the motion sleds 116 relative to the stanchions 112 are maintained. During the dynamic event and responsive to exceeding the predetermined threshold load value, the energy absorbers act to attenuate energy as the motion sleds 116 stroke relative to the stanchions 112. In some embodiments, the full range of motion of the motion sleds 116 may range from about 6 inches to about 12 inches depending on the height of the seat bucket 104 relative to the floor.

In some embodiments, the seat bucket 104 attaches to the motion sled 116 at multiple locations, for instance a top attachment location and a bottom attachment location. In some embodiments, each seat bucket 104 and motion sled 116 coupling includes at least three attachments locations, for instance an upper location, a lower location, and a middle location positioned between the upper and lower locations. FIG. 2 illustrates a non-limiting example of an attachment location 118 formed on the motion sled 116 for attaching the seat bucket, directly or indirectly. FIG. 2 further illustrates the nested configuration of the motion sled 116 and stanchion 112 as discussed in detail below.

Figure 3:
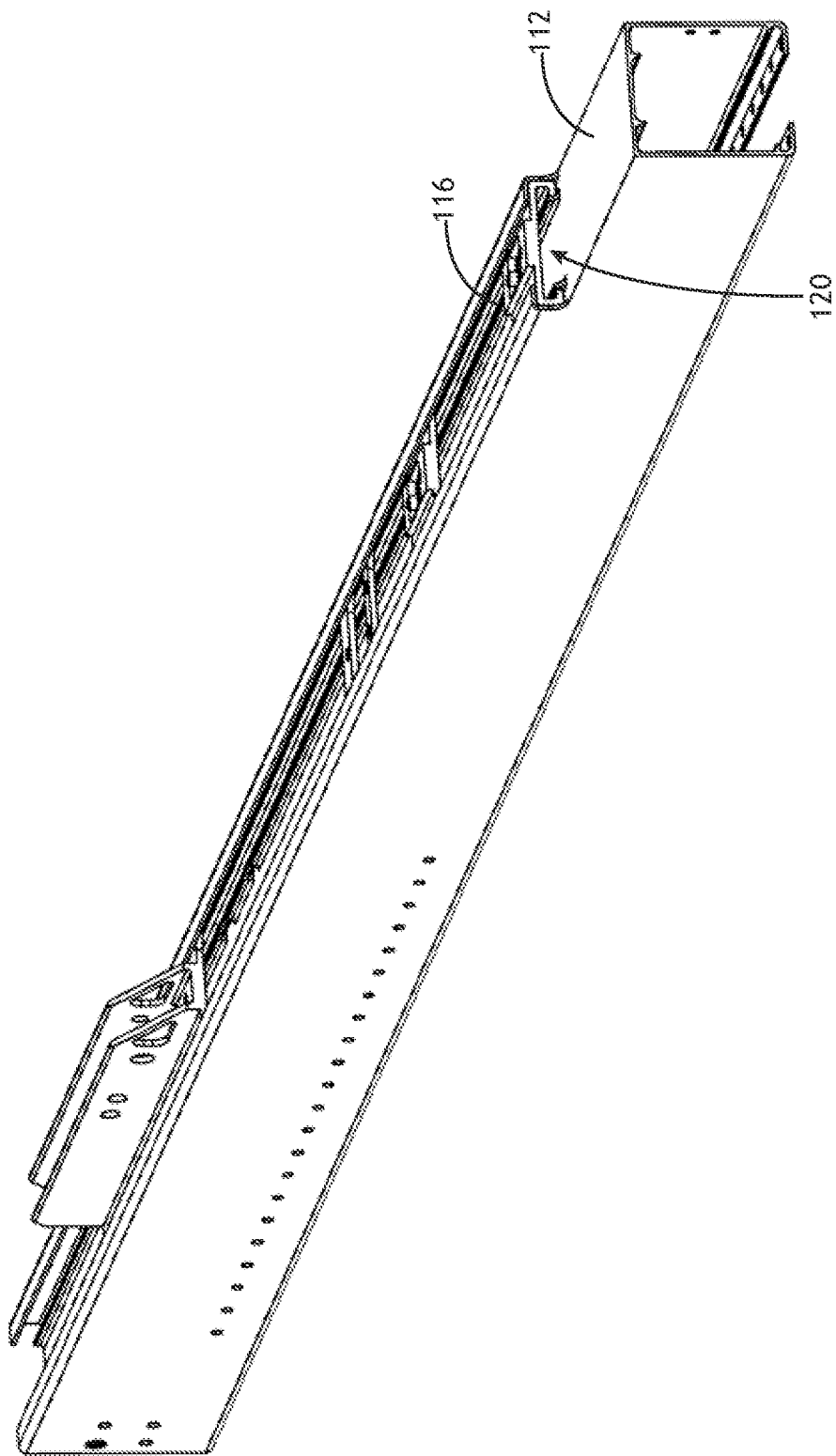
FIG. 3 is an isometric view of a stanchion and motion sled assembly in accordance with an embodiment of this disclosure.

FIG. 3 illustrates a stanchion assembly including a stanchion 112 and motion sled 116. The stanchion defines an elongated guide channel 120 and the motion sled 116 is slidably disposed in the guide channel 120. Each of the stanchion 112, motion sled 116 and guide channel 120 are elongated such that the motion sled 116 and stanchion 112 longitudinally overlap a length from about 6 inches to about 36 inches, more preferably from about 12 inches to about 24 inches. As such, in contrast to the localized action of conventional energy attenuation systems, the comparatively large contact area between the motion sled 116 and stanchion 112 functions to evenly distribute load on the seat bucket from the motion sled 116 to the stanchion 112 forming part of the seat frame. In some embodiments, the energy absorber and nested configuration of the components work together to facilitate stroking while controlling the seat bucket motion.

Figure 4:
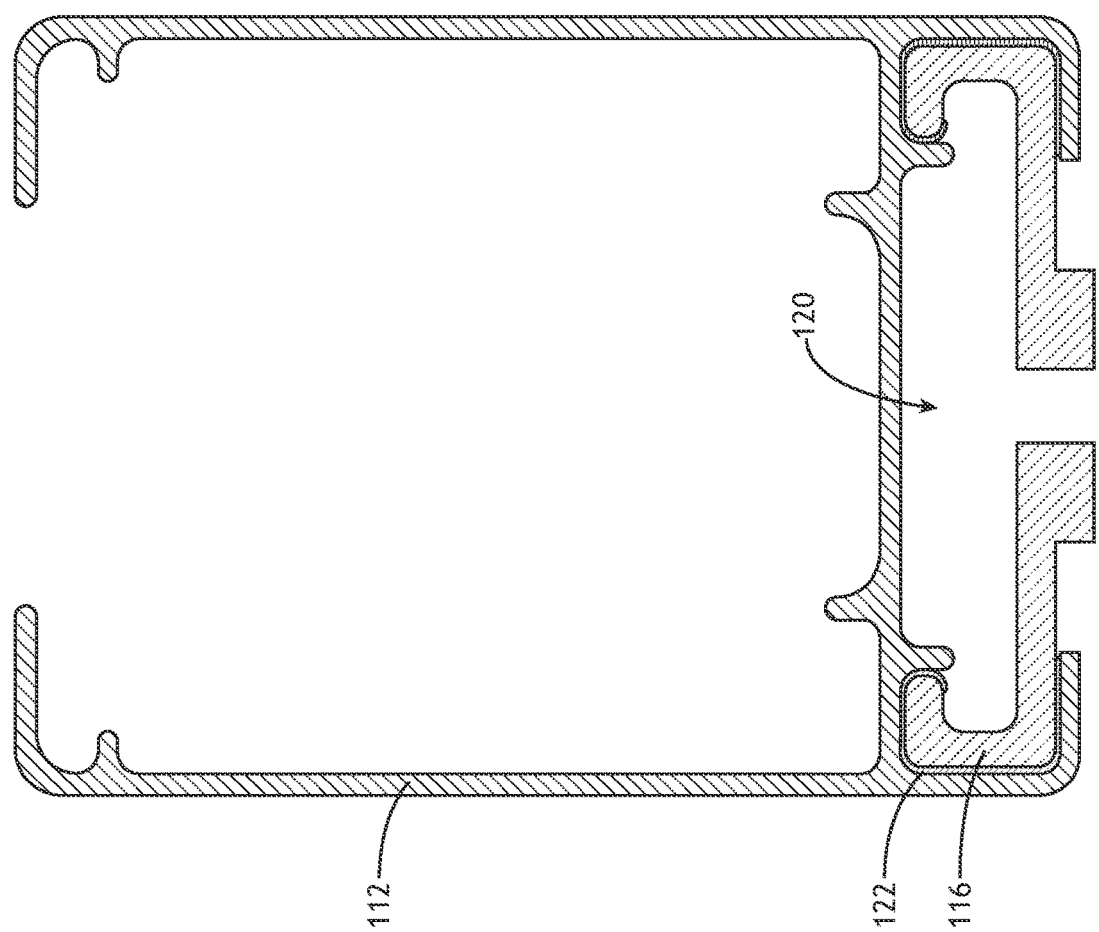
FIG. 4 is a cross section of the stanchion and motion sled assembly of FIG. 3 showing the component relative positions.

FIG. 4 illustrates the shape and nested configuration of the stanchion 112 and motion sled 116 according to an exemplary embodiment. The motion sled 116 is received in the elongated guide channel 120 formed in the stanchion 112. In some embodiments, the portion of the stanchion 112 forming the guide channel 120 is substantially C-shaped and opens in a first direction, and the motion sled 116 is also substantially C-shaped and opens in a second direction facing the first direction to provide multiple contact surfaces between the motion sled 116 and the stanchion 112. In some embodiments, a low friction material 122 (i.e., lower coefficient of friction as compared to at least one of the motion sled 116 and the stanchion 112) is positioned at the interface between the motion sled 116 and the stanchion 112 to facilitate smooth stroking of the motion sled 116. The low friction material 122 may be a separate layer or coating applied to one of the motion sled 116 and the stanchion 112.

Figure 5:
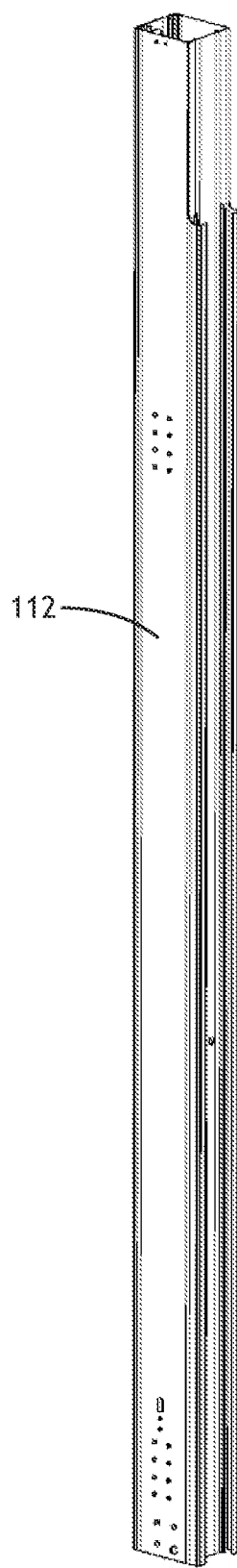
FIG. 5 is an isometric view of a stanchion in accordance with an embodiment of this disclosure.
Figure 6:
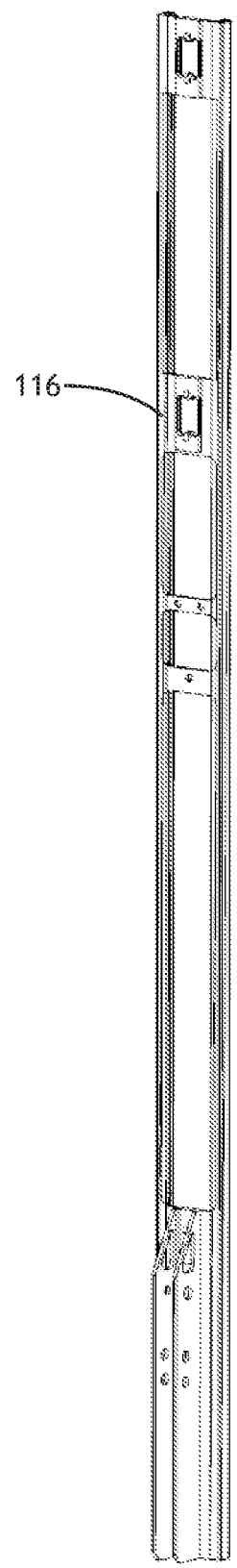
FIG. 6 is an isometric view of a motion sled in accordance with an embodiment of this disclosure.

FIGS. 5 and 6 illustrate non-limiting examples of respective stanchion 112 and motion sled 116 extrusions showing their relatively long lengths.

Figure 7:
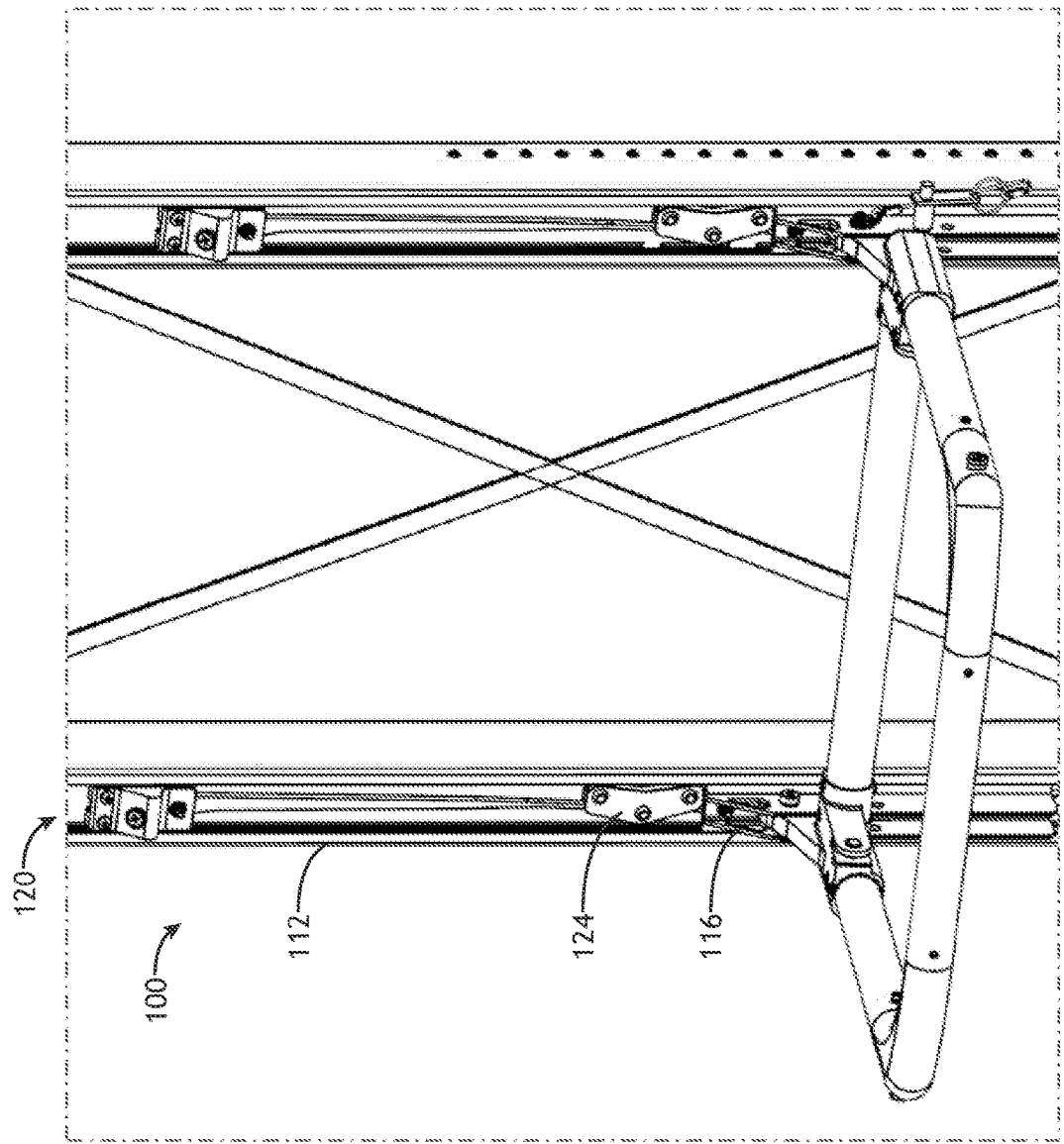
FIG. 7 is a detailed view of a symmetrical stanchion assembly configuration of the aircraft seat in accordance with an embodiment of this disclosure.
Figure 8:
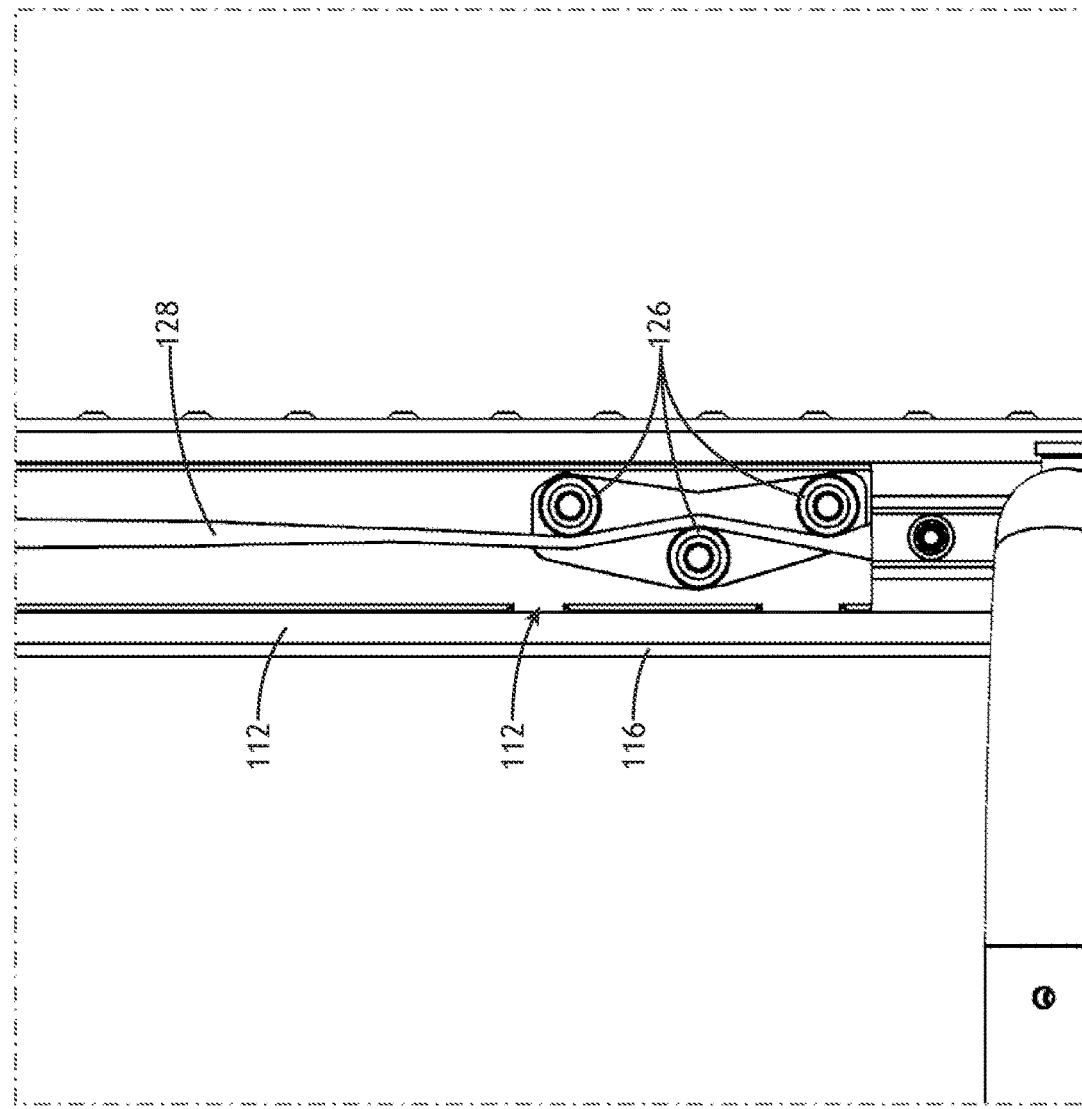
FIG. 8 is a detailed view of a wire bender energy absorber system of the aircraft seat in accordance with an embodiment of this disclosure.

FIGS. 7 and 8 illustrates the portion of the seat assembly 100 including the energy absorbers 124. Each stanchion assembly includes a motion sled 116 and an energy absorber 124, preferably in a symmetrical arrangement to prevent binding during stroking. In some embodiments, each energy absorber 124 is a wire bender system including a plurality of rollers 126 affixed to the stanchion 112 and positioned in the elongated guide channel 120. A wire 128 is affixed at its lower end to the motion sled 116 and at its upper end my rest in a guide space such that when wire deformation occurs the upper end is kept from straying too fat laterally due to distortion of the wire downstream at the rollers causing movement at the upper end of the wire. The wire 128, proximate the bottom attached end, is threaded through the rollers 126 such that the wire is bent and unbent as the wire is pulled through the rollers.

In use, when the load on the seat bucket (corresponding to lumbar spine load on the occupant) exceeds the predetermined threshold load value, movement of the elongated motion sled 116 relative to the stanchion 112 occurs causing the wire 128 to be pulled through the plurality of rollers 126 thereby deforming the wire by bending the wire thereby attenuating energy. In some embodiments, the wire 128 increases in cross section toward a top end of the wire such that resistance to motion increases as the seat bucket strokes further downward relative to the stationary stanchions 116.

Figure 9:
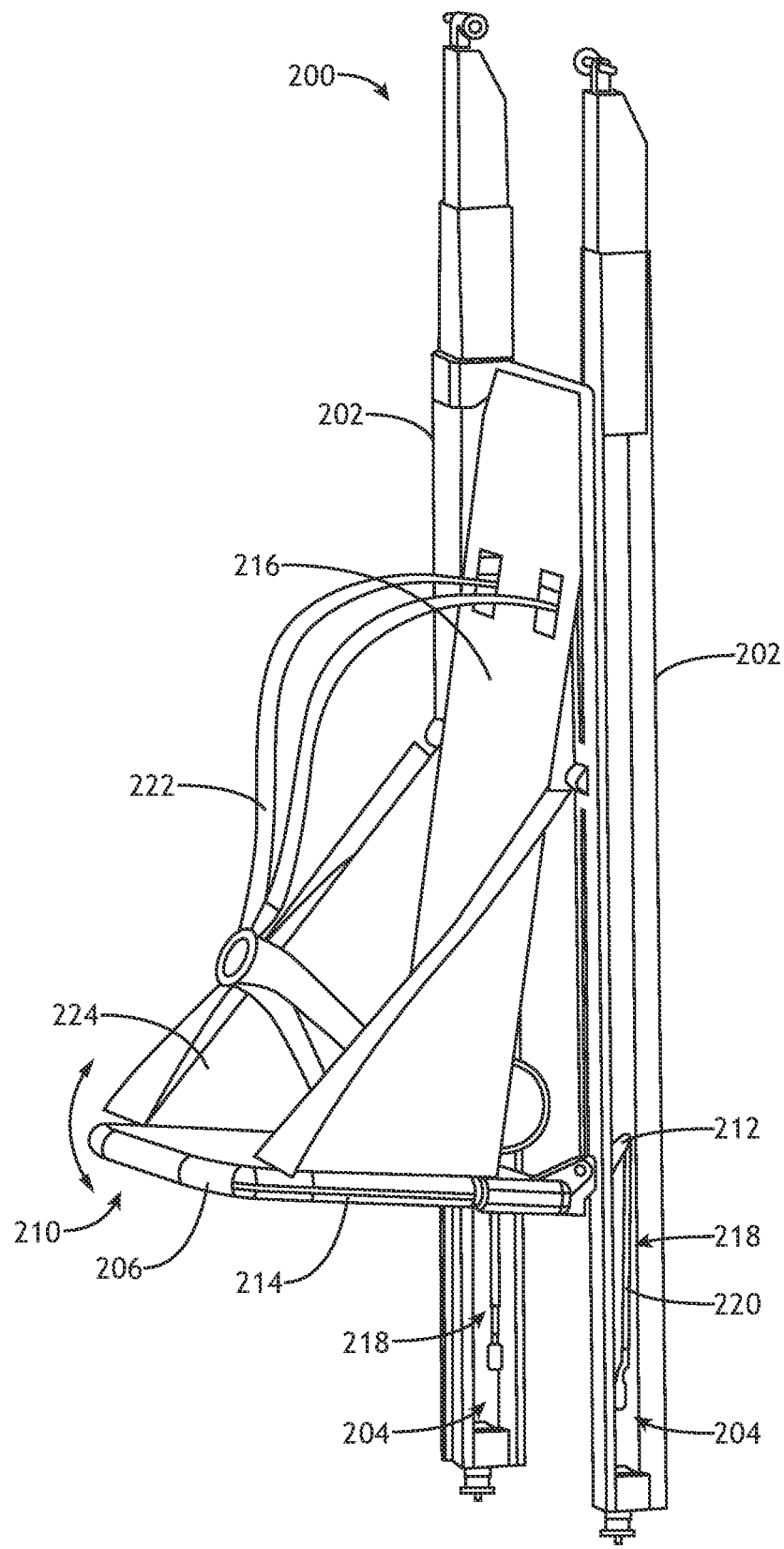
FIG. 9 is a front perspective view of the aircraft seat assembly equipped with an internally housed seat pan return mechanism in accordance with an embodiment of this disclosure.

FIG. 9 illustrates a further feature of the aircraft seat assembly, and particularly an internally housed return spring mechanism for automatically returning the deployed seat pan to a stowed position. The return spring mechanism is compatible with the motion controller and energy absorbers discussed above or may be employed separately on an aircraft seat without at least one of the motion controller and energy absorbers discussed above.

The aircraft seat assembly 200, which may also be the assembly 100, generally includes the first and second stanchions 202 (e.g., corresponding to left and right stanchions) positioned parallel and in spaced apart relation. Each stanchion 202 forms, defines or otherwise includes an interior space 204 proximate the attachment of the seat pan 206 to the stanchions, such that the first and second stanchions form respective first and second interior spaces. Each stanchion defines, forms or otherwise includes a forward slot (see FIG. 10B at 208) providing an entrance and access to the respective interior spaces. In some embodiments, the forward slots 208 are vertical, narrow, and elongated.

The seat pan 206 is rotationally coupled, for instance pivotally attached, to the first and second stanchions 202. The seat pan 206 is configured to rotate between a stowed position in which the seat pan is folded against the seat back, and a deployed position shown in the figures. Seat pan motion is indicated by the directional arrow shown in FIG. 9. The seat pan includes a forward portion 210 defining the sitting surface and first and second rearward extensions 212 or arms that extend through the respective first and second forward slots and are received in the respective first and second interior spaces 204. In some embodiments, the seat pan 206 includes a tubular U-shaped member 214 supporting a rigid or flexible seat. When the seat pan 206 is deployed as shown, the forward portion 210 extends in the forward direction of the seat and the rearward portions extend in the rearward direction of the seat, toward to the stanchions 202.

In some embodiments, the seat assembly 200 further includes a seat back 216. In some embodiments, the seat back 216 is attached at one end to the first and second stanchions 202 and at an opposing end to the seat pan 206. In some embodiments, at least one of the attachments is a pivotal attachment such that movement of the seat pan 206 toward the stowed position causes the bottom end of the seat back 216 to move toward, and in some embodiments between, the first and second stanchions 202.

First and second spring mechanisms 218 are associated with the respective first and second stanchions 202 and the rearward seat pan extensions and operate to act on the left and right sides of the seat in a symmetrical configuration. Each spring mechanism 218 includes an elongated extension spring 220 that resides in its respective interior space 204. The first extension spring 220 is therefore attached at one end to the first rearward extension 212 and attached at an opposing end to the first stanchion 202, and the second extension spring 220 is attached at one end to the second rearward extension 212 and attached at an opposing end to the second stanchion 202. Movement of the seat pan 206 toward the deployed position elongates the first and second elongation springs 220 thereby energizing the springs. In other words, rotational motion of the seat pan toward the deployed position drives the attached spring ends apart thereby introducing tension in the spring. Releasing the seat pan 206, for instance when the seat pan unloads, causes the springs to shorten to release the tension thereby applying a pulling force on the rearward extensions that acts through the seat pan pivot to rotate the forward end of the seat pan upward.

In some embodiments, the seat assembly further includes a passenger restraint such as a multi-point restraint 222. In some embodiments, the seat assembly 200 further includes first and second flexible side bolsters 224 coupled between the seat back 216 and the seat pan 206.

Figure 10A:
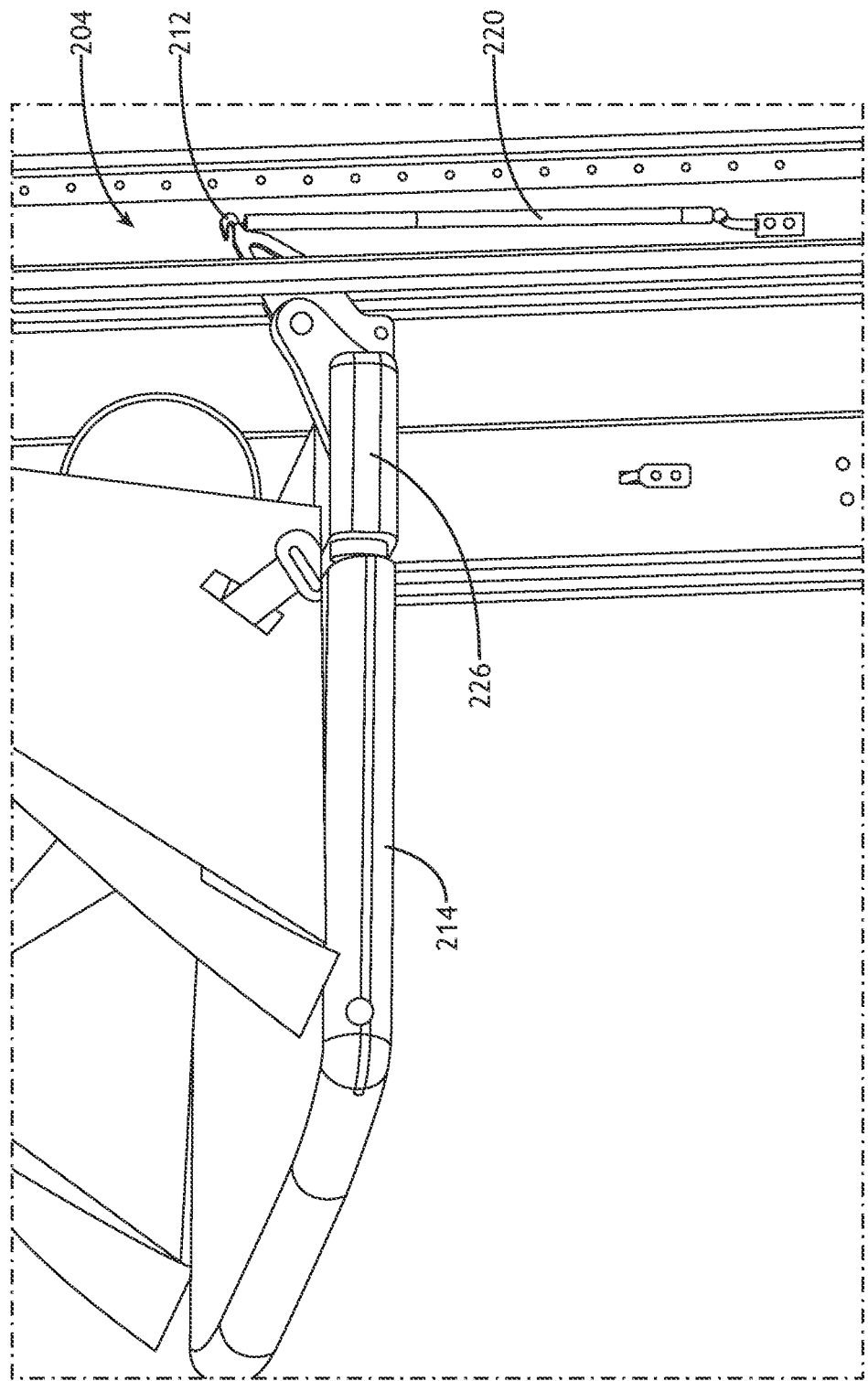
FIG. 10A is a detailed view of the aircraft seat assembly of FIG. 9 illustrating the internally housed return spring mechanisms.
Figure 10B:
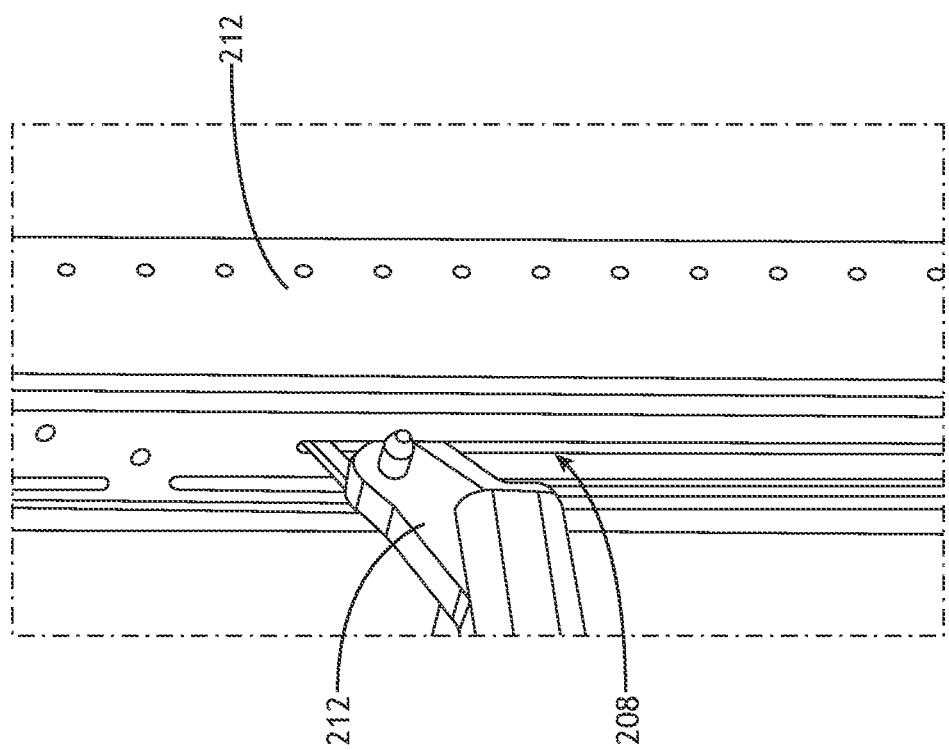
FIG. 10B is a detailed view of the aircraft seat assembly of FIG. 9 illustrating the forward stanchion slots receiving the seat pan extension arms.

FIG. 10A illustrates the concealment of the extension springs 220 within the interior spaces 204 formed in the stanchions 202, as well as the attachment of the extension springs 220 between the rearward extensions 212 and respective stanchion 202. FIG. 10A further illustrates the tubular U-shaped member 214 received in end fittings 226 forming the rearward extensions 212. Further apparent in FIG. 10A is the attachment location of the seat back forward of the pivotal attachment of the seat pan 206 to the stanchions, thereby providing separate rotational axes for the seat pan and the seat back. FIG. 10B illustrates the forward slots 208 and entry of the rearward extensions 212 through the forward slots. The forward slots 208 are elongated to accommodate seat pan rotation to energize (e.g., stretch) the elongation springs.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. An aircraft seat assembly, comprising:
   first and second stanchions forming respective first and second interior spaces accessible through respective first and second forward slots;
   a seat pan pivotally attached to the first and second stanchions, the seat pan including first and second rearward extensions that extend through the respective first and second forward slots and are received in the respective first and second interior spaces;
   a seat back attached at one end to the first and second stanchions; and
   first and second spring mechanisms that reside in the respective first and second interior spaces, wherein the first spring mechanism includes a first extension spring attached at one end to the first rearward extension and attached at an opposing end to the first stanchion, and the second spring mechanism includes a second extension spring attached at one end to the second rearward extension and attached at an opposing end to the second stanchion;
   wherein movement of the seat pan toward a deployed position of the seat pan elongates the first and second extension springs.

2. The aircraft seat assembly according to claim 1, wherein an opposing end of the seat back is pivotally attached to the seat pan forward of the pivotal attachment of the seat pan to the first and second stanchions.

3. The aircraft seat assembly according to claim 1, wherein the first and second forward slots are elongated vertical slots.

4. The aircraft seat assembly according to claim 1, wherein the attachment of the opposing ends of the first and second extension springs to the respective first and second stanchions is positioned below the pivotal attachment location of the seat pan to the first and second stanchions.

5. The aircraft seat assembly according to claim 1, wherein the seat pan includes a tubular U-shaped frame member.

6. The aircraft seat assembly according to claim 1, further comprising first and second flexible side bolsters coupled between the seat back and the seat pan.

7. The aircraft seat assembly according to claim 1, further comprising a multi-point passenger restraint.

8. The aircraft seat assembly according to claim 1, wherein the seat pan is configured to pivot and between a stowed position and the deployed position, and wherein movement of the seat pan toward the stowed position causes a bottom end of the seat back to move in a direction toward the first and second stanchions.

9. The aircraft seat assembly according to claim 1, wherein each of the first and second stanchions are extruded.

10. An aircraft seat assembly, comprising:
    first and second stanchions forming respective first and second interior spaces accessible through respective first and second forward slots;

a seat pan rotationally coupled to the first and second stanchions and configured to rotate between a stowed position and a deployed position, the seat pan including first and second rearward extensions that extend through the respective first and second forward slots and are received in the respective first and second interior spaces; and first and second springs mechanisms that reside in the respective first and second interior spaces, wherein the first spring mechanism includes a first extension spring attached at one end to the first rearward extension and attached at an opposing end to the first stanchion, and the second spring mechanism includes a second extension spring attached at one end to the second rearward extension and attached at an opposing end to the second stanchion;

wherein rotation of the seat pan toward the deployed position simultaneously elongates the first and second extension springs.

11. The aircraft seat assembly according to claim 10, wherein the first and second forward slots are elongated vertical slots.

12. The aircraft seat assembly according to claim 10, wherein the first and second extension springs are oriented substantially vertical in the respective first and second interior spaces.

13. The aircraft seat assembly according to claim 10, further comprising a seat back attached at one end to the first and second stanchions and attached at an opposing end to the seat pan.

14. The aircraft seat assembly according to claim 13, further comprising first and second flexible side bolsters coupled between the seat back and the seat pan.

15. The aircraft seat assembly according to claim 10, further comprising a multi-point passenger restraint.

\* \* \* \* \*